United States Patent [19]
Bagley

[11] Patent Number: 5,655,083
[45] Date of Patent: Aug. 5, 1997

[54] PROGRAMMABLE RSET SYSTEM AND METHOD FOR COMPUTER NETWORK

[75] Inventor: Norman J. Bagley, Wakefield, Mass.

[73] Assignee: EMC Corporation, Hopkinton, Mass.

[21] Appl. No.: 482,344

[22] Filed: Jun. 7, 1995

[51] Int. Cl.⁶ .................................................. G06F 11/30
[52] U.S. Cl. .................. 395/182.31; 395/185.04
[58] Field of Search .............. 395/800, 200.11, 395/185.04; 371/62

[56] References Cited

U.S. PATENT DOCUMENTS

| | | | |
|---|---|---|---|
| 4,621,322 | 11/1986 | Suzuki | 395/182.08 |
| 4,956,807 | 9/1990 | Hosaka | 371/62 |
| 5,095,444 | 3/1992 | Motles | 395/200.11 |
| 5,109,392 | 4/1992 | Nakano | 371/62 |
| 5,155,846 | 10/1992 | Mino | 395/575 |
| 5,276,857 | 1/1994 | Hartung | 395/200.11 |
| 5,341,497 | 8/1994 | Younger | 395/575 |
| 5,398,332 | 3/1995 | Komoda | 371/62 |
| 5,450,576 | 9/1995 | Kennedy | 395/650 |
| 5,513,319 | 4/1996 | Finch | 395/185.08 |
| 5,528,756 | 6/1996 | Molnar | 395/185.08 |

*Primary Examiner*—Eric Coleman
*Attorney, Agent, or Firm*—Richard A. Jordan; Mark J. Casey; John M. Gunther

[57] ABSTRACT

A network includes a plurality of computer systems interconnected by a plurality of communication links. At least one of the computer systems includes a resettable computer and a reset circuit. The reset circuit is actuable in response to the receipt of a message containing a received reset code value for generating an interrupt signal and to begin a timing interval, and at the end of said timing interval to generate a reset signal. If the computer is in its normal operational condition, it is responsive to the interrupt signal from the reset circuit to deactuate the reset circuit prior to the end of the time interval to prevent the reset circuit from generating the reset signal. On the other hand, if the computer is in the hung condition, it does not respond to the interrupt signal, and so the reset circuit at the end of the time interval will generate the reset signal to enable the computer to initiate a reset operation.

29 Claims, 2 Drawing Sheets

PROGRAMMABLE RSET SYSTEM AND METHOD FOR COMPUTER NETWORK

FIELD OF THE INVENTION

The invention relates generally to the field of digital data processing systems and more particularly to remote reset control arrangements in which one computer in a network comprising a plurality of interconnected computers can reset another computer which may have failed, without the need of a separate wire for carrying a reset signal.

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations are used by individual workers to perform processing in connection with data and programs that may be stored in the network mass storage subsystems; the personal computers/workstations, operating as clients, download the data and programs from the network mass storage subsystems process the data in connection with the programs and enable the processed data to be uploaded to the network mass storage subsystems for storage, to a network printer for printing, or to the telephony interface for transmission over the public telephony system. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations are interconnected by communication links such as electrical wires or optic fibers.

Sometimes during processing, a personal computer/workstation, or any device controlled by a program, may become "hung," that is, because of errors in a program or certain undesirable combinations of data being processed, it may become stuck in an endless program loop. In such a condition, the device is essentially stopped. Particularly if the device is a server, if the device becomes hung it may not be able to service requests from any of the clients, which can cause significant problems for the clients' ability to perform their respective processing tasks.

SUMMARY OF THE INVENTION

The invention provides a new and improved remote reset control arrangements in which one computer in a network comprising a plurality of interconnected computers and/or other devices can reset another computer which may have failed, without the need of a separate wire for carrying a reset signal.

In brief summary, in one aspect the invention provides a network that includes a plurality of computer systems interconnected by a plurality of communication links. At least one of the computer systems includes a resettable computer and a reset circuit. The reset circuit is actuable in response to the receipt of a message containing a received reset code value for generating an interrupt signal and to begin a timing interval, and at the end of said timing interval to generate a reset signal. If the computer is in its a normal operational condition, it is responsive to the interrupt signal from the reset circuit to deactuate the reset circuit prior to the end of the time interval to prevent the reset circuit from generating the reset signal. On the other hand, if the computer is in the hung condition, it does not respond to the interrupt signal, and so the reset circuit at the end of the time interval will generate the reset signal to enable the computer to initiate a reset operation.

In another aspect, the invention provides a computer system for connection in a network. The computer system includes a resettable computer and a reset circuit. The reset circuit is actuable in response to the receipt of a message from the network containing a received reset code value for generating an interrupt signal and to begin a timing interval, and at the end of said timing interval to generate a reset signal. If the computer is in its a normal operational condition, it is responsive to the interrupt signal from the reset circuit to deactuate the reset circuit prior to the end of the time interval to prevent the reset circuit from generating the reset signal. On the other hand, if the computer is in the hung condition, it does not respond to the interrupt signal, and so the reset circuit at the end of the time interval will generate the reset signal to enable the computer to initiate a reset operation.

In yet another aspect, the invention provides a method of resetting a resettable computer system, the computer system having a normal condition and a hung condition. In accordance with the method, the computer system initially receives a message containing a received reset code value and, in response thereto, generating an interrupt signal and beginning a timing interval. If the computer system is in the normal operational condition, the timing interval is terminated without generating the reset signal. On the other hand, if the computer system is in the hung operational condition, generating a reset signal at the end of the timing interval, the computer system being responsive to generation of the reset signal to initiate a reset operation.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
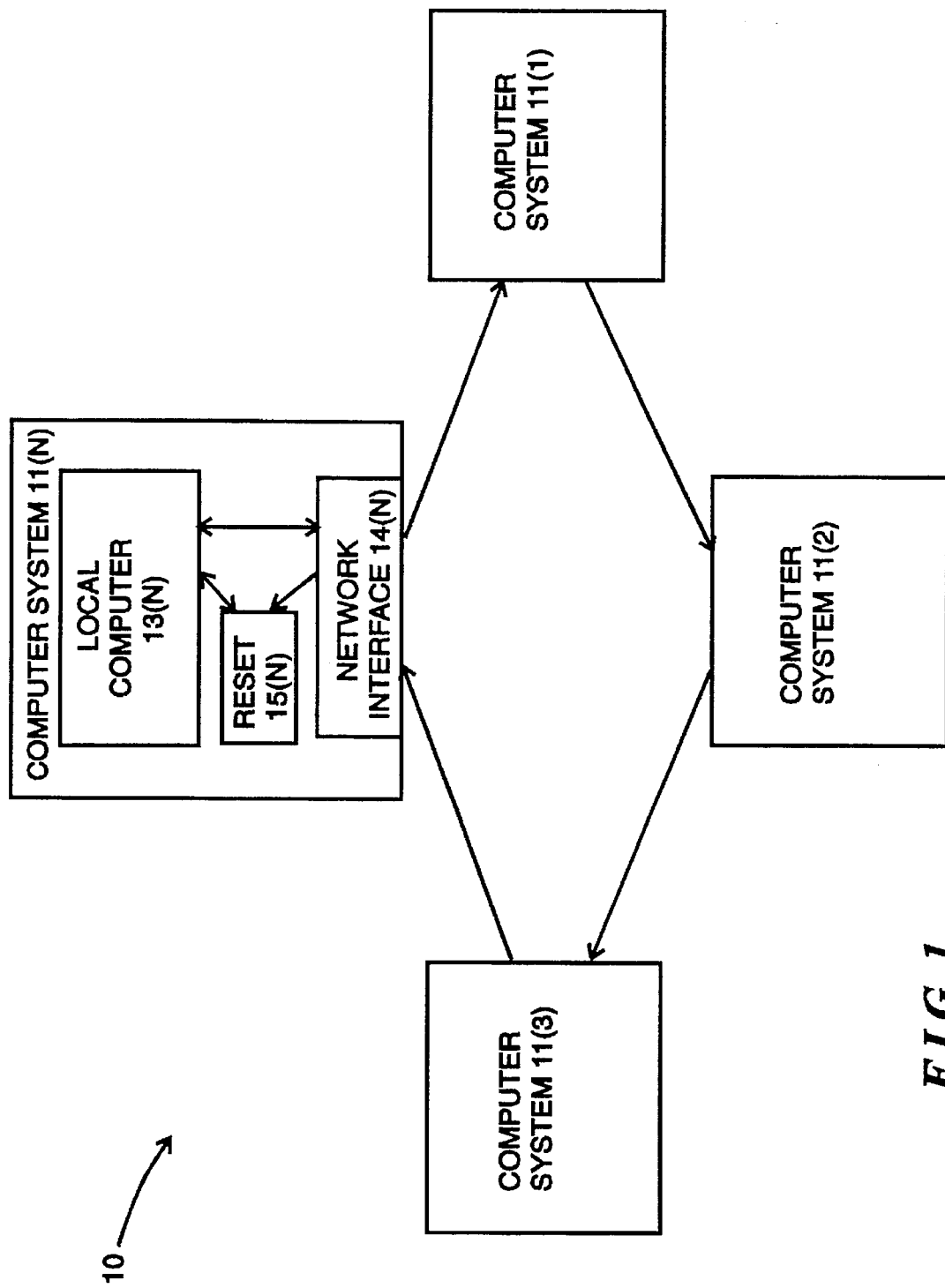
FIG. 1 is a functional block diagram of a computer network constructed in accordance with the invention.

FIG. 1 is a general schematic diagram of a computer network 10 constructed in accordance with the invention. With reference to FIG. 1, the computer network includes a plurality of computer systems 11(1) through 11(N) (generally identified by reference numeral 11(n)) which are interconnected by communication links 12(1) through 12(N) (generally identified by reference numeral 12(n)). In the embodiment depicted in FIG. 1, the computer network 10 is in the form of a ring topology, so that each communication link 12(n) connects the correspondingly indexed computer system 11(n) to computer system 11(n+1), although it will be appreciated that the invention may be used in connection with networks of other topologies. In addition, in one embodiment the communication links 12(n) are in the form of optical fibers, over which communications proceed serially, although it will be appreciated that other media may also be used.

The computer systems 11(n) depicted in FIG. 1 may all generally be similar. An illustrative computer system 11(n) includes a conventional computer 13(n), including a local processor (not separately shown) which performs processing operations in connection with data and instructions stored in a local memory and local mass storage device (also not separately shown). In addition, the computer may also include operator input devices such as a keyboard and/or mouse device which allow an operator to input data and control information for controlling processing, a display device such as a video display for displaying status and processed data to the operator, and a local printer for generating hardcopy output.

The illustrative computer system 11(n) will also include a network interface 14(n) which interfaces the computer 13 to the communication links 12(n) and 12(n-1) to facilitate communications with other computer systems in the network 10. Information is transferred over the network in the form of messages, with each message including an address, identifying the computer system 11(n) to receive the message, and data. The network interface 14(n) will include arrangements for transmitting messages over communication link 12(n) to the next computer system 11(n+1) in the system, and for receiving messages over communication link 12(n-1) from the preceding computer system 11(n-1) in the system. If the network interface 14(n) receives a message whose address identifies the computer system 11(n), it will receive the message and couple the data to the local computer 13(n) for processing. On the other hand, if the network 14(n) receives a message whose address identifies another computer system in the network 10, it will couple the message from the communication link 12(n-1) to the next communication link 12(n) to transfer the message to the next computer system 12(n+1).

Although the network 10 has been described as including a number of computer systems 11(n), it will be appreciated that a number of types of systems may be connected in the network 10, including, for example, mass storage subsystems for storing data or programs which may be accessed by one or a number of computer systems 11(n) in the network 10, interfaces to other networks or the public telecommunications systems, hardcopy output devices such as network printers, and the like. In addition, while the network 10 has been described as comprising a plurality of computer systems 11(n) and other system devices interconnected by communication links 13(p), it will be appreciated that it may comprise various interconnected components within a device or subsystem. For example, within a mass storage subsystem it may comprise elements such as a system interface/controller and a number of storage devices such as disk or tape storage devices, for use in controlling transfers of control information and data between the system interface/controller and the storage devices.

In accordance with the invention, at least one of the computer systems 11(n) in the network 10 is provided with a reset circuit 15(n) which can be externally controlled, that is, controlled by one or more of the other computer systems 11(n') in the network 10 to perform a reset operation in connection with the local computer 13(n) of computer system 11(n). This may be useful if, for example, the computer system 11(n) becomes "hung" and needs to be rebooted. As will be described in more detail below in connection with FIG. 2, if the local computer 13(n) has suitably initialized its reset circuit 15(n), another computer system 11(n') can, by use of a message addressed to computer system 11(n), actuate the reset circuit 15(n). Upon actuation, the reset circuit 15(n) will issue an interrupt to the local computer 13(n) and start a timer. If the local computer 13(n) is not "hung," it will process the interrupt and, as part of the service routine it processes in response to the interrupt, deactuate the reset circuit 15(n). On the other hand, if the local computer 13(n) is "hung," it will not be able to process the interrupt service routine, in which case the reset circuit will reset the local computer 13(n).

Figure 2:
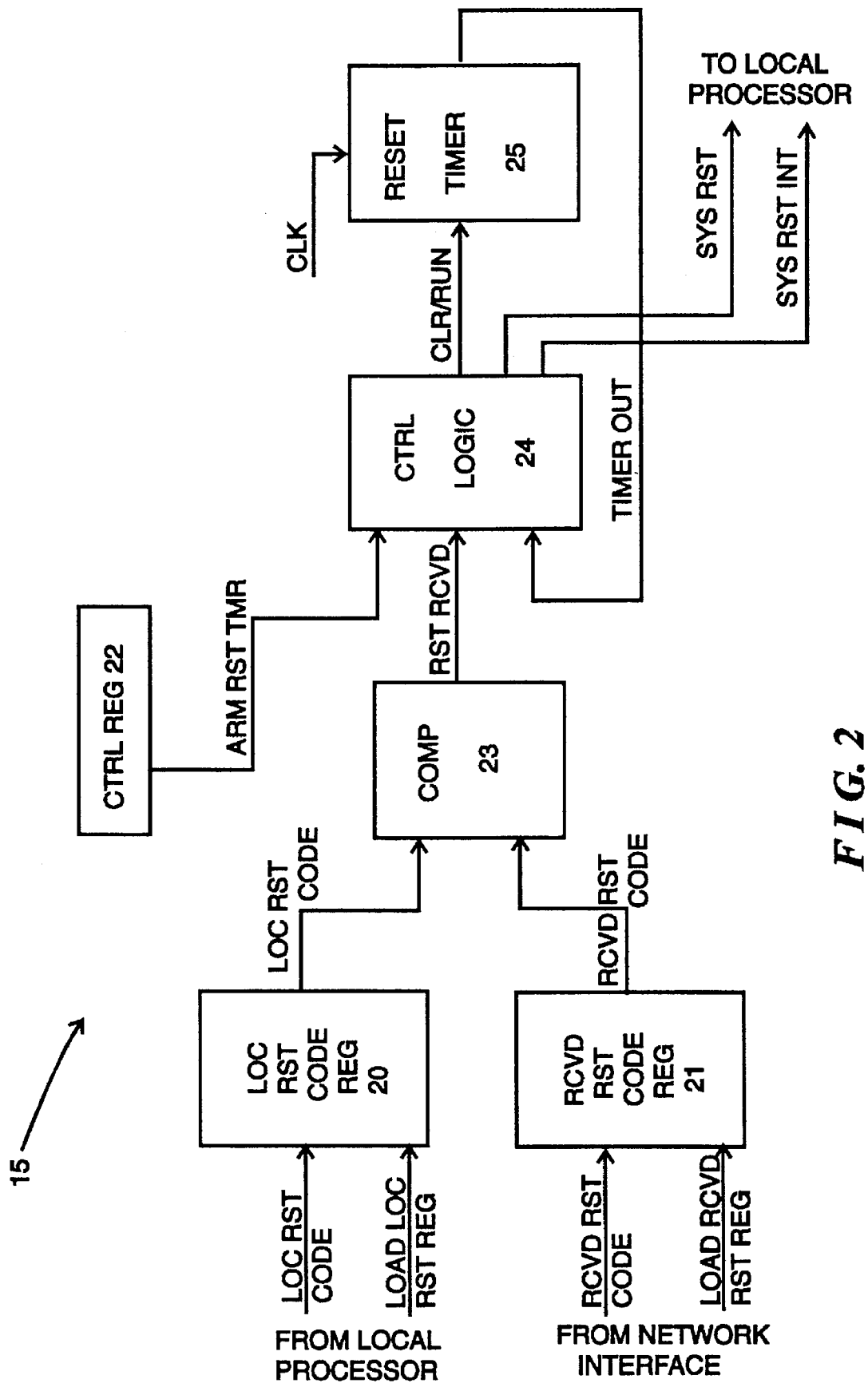
FIG. 2 is a schematic logic diagram of a reset circuit useful in connection with the network depicted in FIG. 1.

FIG. 2 depicts a logic diagram of a reset circuit 15(n) in detail. With reference to FIG. 2, the reset circuit 15(n) includes three registers, namely, a local reset code register 20, a received reset code register 21 and a control register 22, a comparator 23, control logic 24 and a reset timer 25. The local reset code register 20 is loaded by the local computer 13(n) with a local reset code value, and the received reset code register 21 may be loaded by the network interface 14(n) with a received reset code value. The network interface 14(n) will load the received reset code register 21 if it receives a message that includes data that enables it to do so. Such a message will be generated by another computer system 11(n') for the purpose of resetting the computer system 11(n) which includes the reset circuit 11(n). To load the local reset code register 20, the local computer 13(n) will generate appropriate LOC RST CODE local reset code signals corresponding to the local reset code value, and assert a LOAD LOC RST REG load local reset register signal. In response to the assertion of the LOAD LOC RST REG signal, the local reset code register 20 will latch the LOC RST CODE signals. The local reset code register 20 will thereafter provide LOC RST CODE local reset code signals, corresponding to the local reset code value, to one input of the comparator 23.

Similarly, to load the received reset code register 21, the network interface 14(n) will provide appropriate RCVD RST CODE received reset code signals corresponding to the reset code in the received message, and assert a LOAD RCVD RST REG load received reset register signal. In response to the assertion of the LOAD RCVD LOG RST REG signal, the received reset code register 21 will latch the RCVD RST CODE signals. The received reset code register 21 will thereafter provide RCVD RST CODE received reset code signals, corresponding to the received reset code value, to the second input of the comparator 23.

If the LOC RST CODE local reset code signals from the local reset code register 20 correspond to the RCVD RST COD received reset code signals from the received reset code register 21, the comparator 23 will assert a RST RCVD reset received signal. The assertion of the RST RCVD reset received signal indicates that another computer system 11(n') believes that the computer system 11(n) is "hung" and is attempting to reset it. If a control register 22, which is also controlled by the local computer 13(n), is asserting an ARM RST TMR arm reset timer signal, the control logic 24 will assert a SYS RST INT system reset interrupt signal to interrupt the local computer 13(n). In addition, the control logic will assert a CLR/RUN clear/run signal which clears the reset timer 25 and enables it to begin measuring a timing interval using the computer system's CLK clock signal.

If the local computer 13(n) is not in a "hung" condition, it will respond to the assertion of the SYS RST INT system reset interrupt signal by processing an interrupt service routine. In processing the interrupt service routine, the local computer will load a value in the control register 22 to enable it (the control register 22) to negate the ARM RST TMR arm reset timer signal. In response to the negation of the ARM RST TMR signal, the control logic 24 will negate the CLR/RUN clear/run signal, disabling the reset timer 25. After the local computer 13(n) returns form the interrupt service routine, it will resume processing operations that it was performing prior to the interrupt service routine.

On the other hand, if the local computer is in a "hung" condition, the hung condition will cause it to ignore the SYS RST INT system reset interrupt signal. As a result, the reset timer 25 will continue operating until it times out at the end of the timing interval. When that occurs, the reset timer 25 will assert a TIMER OUT signal. In response to the assertion of the TIMER OUT signal, the control logic 24 will assert a SYS RST system reset signal, which, in turn, causes a reset of the local computer system 13(n), thereby to remove the "hung" condition.

It will be appreciated that a number of modifications may be made to the reset circuit 15(n) depicted in FIG. 2. For example, as noted above, the local computer 13(n) can control the operation of the reset circuit 15(n) by loading a local reset value in the local reset code register 20. As an alternative, instead of providing registers 20 and 21 and a comparator 23, the network interface 14(n) may provide the RST RCVD reset received signal directly in response to receipt of a predetermined sequence of data bits in a message addressed to the computer system 11(n). In such an arrangement, the local computer 13(n) would not control the actuation of the reset circuit.

The invention provides a number of advantages. In particular, it provides an arrangement whereby one computer system 11(n') (or other device) in a network 10 can reset another computer system 11(n) (or other resettable device) in the network 10 without requiring a separate reset line. Providing a separate line for a function such as resetting can be relatively expensive, particularly if the network is distributed over a relatively wide area, necessitating relatively long communication links 12(n).

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network comprising a plurality of computer systems interconnected by at least one communication link, at least one of said computer systems comprising:

A. a network interface for receiving messages from said at least one communication link;

B. an actuable reset circuit for, in response to the network interface receiving a message containing a reset code value, generating an interrupt signal and beginning a timing interval, and at the end of said timing interval generating a reset signal; and C. a resettable computer connected said reset circuit, the computer having a normal operational condition and a hung condition, the computer, while in the normal operational condition being responsive to said interrupt signal to deactuate the reset circuit to prevent the reset circuit from generating the reset signal, the computer while in the hung condition being non-responsive to the interrupt signal, the computer being responsive to the reset signal to initiate a reset operation;

whereby, if the computer is in the normal operational condition when a message containing the received reset code value is received, the reset circuit will not enable the computer to perform the reset operation, but if the computer is in the hung condition when a message containing the received reset code value is received, the reset circuit will enable the computer to perform the reset operation.

2. A computer system for connection to a network comprising:

A. a network interface for receiving messages;

B. an actuable reset circuit for, in response to the network interface receiving a message containing a reset code value, generating an interrupt signal and beginning a timing interval, and at the end of said timing interval generating a reset signal; and C. a resettable computer connected said reset circuit, the computer having a normal operational condition and a hung condition, the computer, while in the normal operational condition being responsive to said interrupt signal to deactuate the reset circuit to prevent the reset circuit from generating the reset signal, the computer while in the hung condition being non-responsive to the interrupt signal, the computer being responsive to the reset signal to initiate a reset operation;

whereby, if the computer is in the normal operational condition when a message containing the received reset code value is received, the reset circuit will not enable the computer to perform the reset operation, but if the computer is in the hung condition when a message containing the received reset code value is received, the reset circuit will enable the computer to perform the reset operation.

3. A computer system as defined in claim 2 in which said reset circuit includes

A. an actuable timer circuit operable to generate a time-out signal a predetermined time interval after receiving a timer actuation signal, B. an actuable reset control circuit operable to generate said interrupt signal and said timer actuation signal in response to receipt of said reset code value thereby to actuate said timer circuit, the reset control circuit being responsive to a reset circuit deactuation signal for deactuating said timer circuit, the reset circuit deactuation signal being controlled by said computer.

4. A computer system as defined in claim 3 in which said computer generates said reset circuit deactuation signal in response to said interrupt signal while in the normal operational condition.

5. A computer system as defined in claim 3 in which said reset circuit further includes a reset control register operable to generate a reset control circuit enable signal in response to reset control enable information controlled by said computer.

6. A computer system as defined in claim 5 in which:

A. said reset control register normally asserts said reset control circuit enable signal thereby actuating said reset control circuit; and B. said computer, in response to said interrupt signal in said normal operational mode, provides reset control enable information for enabling said reset control register to negate said reset control circuit enable signal thereby to deactivate said reset control circuit.

7. A computer system as defined in claim 3 in which actuation of said reset control circuit is further controlled by a local reset code value.

8. A computer system as defined in claim 7 in which said reset circuit further comprises an actuation control circuit comprising:

A. a local reset code value store operable to store a local reset code value; and B. a comparator operable to generate a reset control circuit actuation signal to actuate reset control circuit for in response to a comparison between said reset code value and said local reset code value stored in said local reset code value store.

9. A computer system as defined in claim 7 in which said local reset code value is controlled by said computer.

10. A method of resetting a computer system resettable in response to a reset signal, the computer system having a normal condition and a hung condition, the method comprising the steps of:

A. receiving a message containing a received reset code value and, in response thereto, generating an interrupt signal and beginning a timing interval;

B. if the computer system is in the normal operational condition, following generation of said interrupt signal terminating the timing interval without generating the reset signal; and C. if the computer system is in the hung operational condition, following generation of said interrupt signal generating a reset signal at the end of the timing interval, the computer system being responsive to generation of the reset signal to initiate a reset operation.

11. A method as defined in claim 10 in which, if said computer system is in the normal operational condition, said computer system enables said timing interval to be terminated in response to said interrupt signal.

12. A method as defined in claim 10 in which generation of said interrupt signal and beginning of said timing interval are also controlled by a local reset code value.

13. A method as defined in claim 12 further comprising the step of comparing said received reset code value and said local reset code value and controlling generating said interrupt signal and beginning of said timing interval in response to the comparison.

14. A method as defined in claim 12 in which said local reset code value is controlled by said computer system.

15. A reset circuit for controlling resetting of a resettable device, the reset circuit comprising:

A. a reset timer for generating a reset enable signal to reset the resettable device at the end of a predetermined timing interval;

B. a reset timer start control responsive to the receipt of a reset indication for starting the reset timer and for generating an interrupt signal to interrupt the resettable device;

C. a reset timer stop control responsive to the receipt of a deactivation indication from said resettable device to deactivate the reset timer thereby to enable the reset timer to avoid generating the reset enable signal.

16. A reset circuit as defined in claim 15 in which said resettable device generates said reset circuit deactivation indication in response to said interrupt signal while in a normal operational condition.

17. A reset circuit as defined in claim 15 in which said resettable device does not generate said reset circuit deactivation indication in response to said interrupt signal while in an abnormal operational condition.

18. A reset circuit as defined in claim 15 further including a reset control register operable to generate a reset enable control signal for enabling said reset timer start control in response to reset enable control information.

19. A reset circuit as defined in claim 18 in which said reset enable control information is controlled by said resettable device.

20. A reset circuit as defined in claim 18 in which:

A. said reset control register normally asserts said reset enable control signal thereby enabling said reset timer start control; and B. said resettable device, in response to said interrupt signal in said normal operational mode, provides reset control enable information for enabling said reset control register to negate said reset enable control signal.

21. A reset circuit as defined in claim 20 in which said negated reset enable control signal comprises said deactivation indication.

22. A reset circuit as defined in claim 20 wherein the reset timer start control is further controlled by a local reset code value.

23. A reset circuit as defined in claim 22 further comprising an actuation control circuit comprising:

A. a local reset code value store operable to store a local reset code value; and B. a comparator operable to generate a reset control circuit actuation signal to actuate reset control circuit for in response to a comparison between said reset code value and said local reset code value stored in said local reset code value store.

24. A reset circuit as defined in claim 22 in which said local reset code value is controlled by said resettable device.

25. A method of controlling resetting of a resettable device comprising the steps of:

A. responsive to the receipt of a reset message, starting a reset timer, the reset timer generating an interrupt message at the end of a predetermined timing interval thereby to interrupt the resettable device;

B. responsive to the receipt of a deactivate indication from said resettable device, deactivating the reset timer thereby to enable said reset timer to avoid generating the reset enable signal.

26. A method as defined in claim 25 in which, if said resettable device is in the normal operational condition, said resettable device enables said timing interval to be terminated in response to said interrupt signal.

27. A method as defined in claim 25 in which generation of said interrupt signal and beginning of said timing interval are also controlled by a local reset code value.

28. A method as defined in claim 27 further comprising the step of comparing said received reset code value and said local reset code value and controlling generating said interrupt signal and beginning of said timing interval in response to the comparison.

29. A method as defined in claim 27 in which said local reset code value is controlled by said resettable device.

\* \* \* \* \*